UNITED STATES PATENT OFFICE.

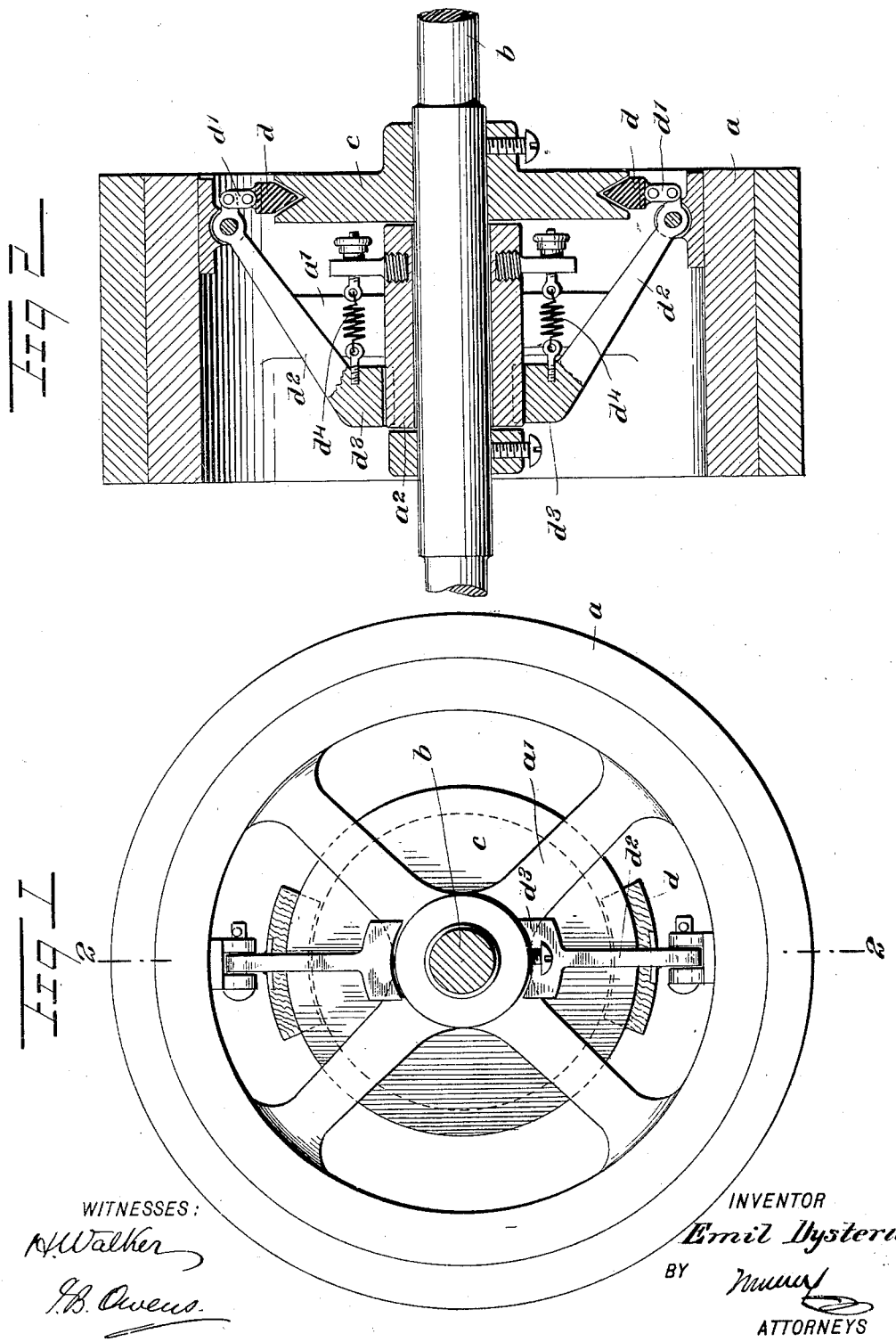

EMIL DYSTERUD, OF MONTEREY, MEXICO.

CLUTCH.

SPECIFICATION forming part of Letters Patent No. 699,461, dated May 6, 1902.

Application filed March 29, 1901. Serial No. 53,478. (No model.)

*To all whom it may concern:*

Be it known that I, EMIL DYSTERUD, a citizen of the United States, and a resident of Monterey, in the State of Nuevo Leon, Republic of Mexico, have invented a new and Improved Clutch, of which the following is a full, clear, and exact description.

This invention relates to a clutch designed especially for use in connection with alternating-current electric motors, but which is also useful in other connections, as will be apparent. In applying the invention to an electric motor it comprises a clutch member carried by a rotary part of the motor and controlled by centrifugal force, this clutch member working with a second member fast on the shaft which is to be driven. When the rotor is revolving at low speed, the shaft is not driven therefrom; but when the rotor reaches a high speed the centrifugal force attending such revolution causes the clutch members to be engaged and the shaft is driven. An example of the use of my invention in connection with an electric motor may be seen in the patent to Elihu Thomson, No. 664,190, December 18, 1900.

This specification is a specific description of one form of the invention, while the claim is a definition of the actual scope thereof.

Reference is to be had to the accompanying drawings, forming a part of this specification, in which similar characters of reference indicate corresponding parts in both views.

Figure 1 is a side elevation of the invention, and Fig. 2 is a section on the line 2 2 of Fig. 1.

$a$ indicates the rotary portion of the electric motor or any other revolubly-driven element. This is mounted by spokes $a'$ and a box $a^2$ loosely on the shaft $b$, which is to be driven from the element $a$.

$c$ indicates a disk which is fastened to the shaft $b$ and preferably formed with a peripheral groove, with the walls of which are engaged clutch members $d$. These clutch members are connected to the element $a$ through the medium of link-joints $d'$ and levers $d^2$, the later being fulcrumed to the rotor $a$. The links $d'$ are connected with the short arm of the levers $d^2$, and the longer arms of the levers extend inward toward the hub $c^2$ and are formed with weighted portions $d^3$, which normally lie close against the hub $a^2$ and are held yieldingly in such position by springs $d^4$.

The parts $a$, $a'$, and $a^2$ being loose on the shaft, when rotating movement is imparted to the part $a$ the levers $d^2$ and clutch members $d$ are carried around with it. As the rotating member $a$ gathers velocity the weighted ends $d^3$ of the levers $d^2$ are thrown outward and the clutch members $d$ are forced into engagement with the clutch-disk $c$, thus fastening the rotor or member $a$ on the shaft and causing the shaft to be driven.

Having thus described my invention, I claim as new and desire to secure by Letters Patent—

The combination of a rotary shaft, a driving member arranged thereon and comprising an outer part or rim, a hub fitted loosely on the shaft and spokes connecting the outer part and hub together, a lever fulcrumed on the outer part of the driving member and carried thereby, the lever having a weighted arm extending between the spokes and normally lying adjacent to the hub, a spring attached to the hub and to the said weighted arm of the lever to hold the arm inward, a clutch member carried by the other arm of the lever, and a disk fastened to the shaft and adapted to be engaged on its periphery by the said clutch member, whereby to fix the driving member to the shaft.

In testimony whereof I have signed my name to this specification in the presence of two subscribing witnesses.

EMIL DYSTERUD.

Witnesses:
PHILIP CARROLL,
PHILIP C. HANNA.